United States Patent Office 3,096,342
Patented July 2, 1963

3,096,342
POLYFLUORINATED 1,4-DITHIIN COMPOUNDS AND THE PROCESS OF PREPARATION
Carl G. Krespan, Wilmington, Del., assignor to E. I. du Pont de Nemours and Company, Wilmington, Del., a corporation of Delaware
No Drawing. Filed Sept. 19, 1960, Ser. No. 56,649
11 Claims. (Cl. 260—327)

This invention relates to new fluorine-containing heterocyclic compounds. More particularly, it relates to, and has as its principal objects provision of, new fluorinated heterocyclic compounds which contain unsaturation and a method for their preparation.

The chemistry of fluorine-bearing compounds has been investigated intensively in recent years but, despite this activity, very few fluorinated heterocyclic compounds are known which contain sulfur as a component of the heterocyclic ring. In particular, no fluorinated heterocyclic compounds have been described which contain one or more olefinic bonds between carbons of the heterocyclic ring. Extension of knowledge in this field of fluorinated compounds has been handicapped by a lack of suitable methods for producing the compounds.

The present invention provides a new class of unsaturated polyfluorinated polycyclic compounds which are 1,4-dithiadienes in which the dithiadiene ring is fused to two polyfluorinated rings, each of which has a double bond in common with the dithiadiene ring.

The compounds can also be described as 1,4-dithiins in which each pair of hydrogens on the doubly-bonded carbons is replaced by a divalent polyfluorohydrocarbon group, a divalent oxygen-interrupted polyfluorohydrocarbon group (i.e., a polyfluorooxahydrocarbon group) or a divalent sulfur-interrupted polyfluorohydrocarbon group (i.e., a polyfluorothiahydrocarbon group), the valences of each of said groups emanating from terminal —$CF_2$— groups and forming with each pair of doubly-bonded carbons a ring of at least four members. The compounds are therefore tricyclic in structure. Preferably, the rings contain at most six members.

The compounds of the invention are represented by the following structural formula:

(I) 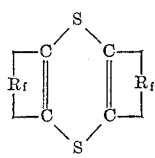

where $R_f$ is a saturated divalent polyfluorohydrocarbon group, a divalent oxygen-interrupted polyfluorohydrocarbon group or a divalent sulfur-interrupted polyfluorohydrocarbon group in which the terminal members are —$CF_2$—, said divalent groups having a continuous chain of at least two carbons and at most one member of the group of sulfur and oxygen. To illustrate, $R_f$ can be —$CF_2CF_2$—, —$CF_2$—O—$CF_2$—, —$CF_2$—S—$CF_2$—
—$CF_2CF_2$—O—$CF_2CF_2$—, —$CF_2$—$CF_2$—$CF_2$—
—$CF_2$—$CF_2$—$CF_2$—$CF_2$—

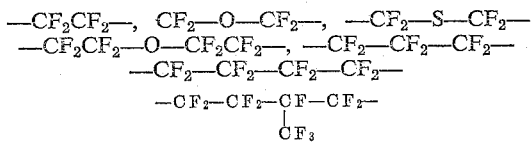

—$CF_2CH_2CF_2$—, —$CF_2$—$CH_2$—$CH_2$—$CF_2$—, and the like. The $R_f$ group can have substituents which are polyfluorohydrocarbon groups, such as $CF_3$— illustrated in the above examples. In a preferred form of the invention, the $R_f$ groups are divalent groups consisting of carbon, fluorine and at most one of the group of sulfur and oxygen, which divalent groups form with the doubly-bonded carbons, rings of four-six members in which the doubly-bonded carbons are each singly bonded to nuclear carbons which bear two fluorine atoms.

The new class of compounds are readily obtained by a simple and economical process which forms a part of this invention. The process, in brief, comprises reacting a metal sulfide with a polyhalogenated polyfluorinated cyclic olefin. The process will be described more fully in later paragraphs.

The following compounds, shown by structural formulae, illustrate the new compounds of the invention:

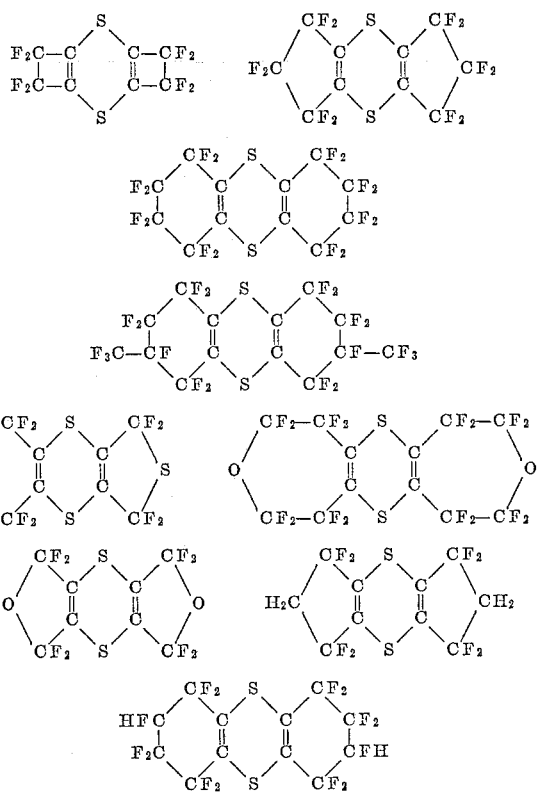

and the like.

It can be seen that the new class of compounds, as illustrated above, have in common a 1,4-dithiin structure as a central cyclic group.

The new compounds are yellow crystalline solids which are soluble in many organic solvents. The compounds dissolve, for example, in acetone, methanol, ethanol, methyl acetate, ethyl acetate, petroleum ether, diethyl ether, dimethylformamide, benzene, toluene, and similar solvents. The compounds are insoluble or only slightly soluble in water. They are stable under conventional storage conditions in containers of corrosion-resistant materials, e.g., glass, aluminum, polyethylene resin, poly(tetrafluoroethylene) resin, and the like. Upon heating to their melting points, the compounds liquefy without decomposition to clear yellow fluids.

The compounds are thermally stable. They can be heated to high temperatures, e.g., 200° C., for prolonged periods in the absence of air without showing any decomposition.

To prepare the compounds a metal sulfide is reacted with a polyhalogenated polyfluorinated cyclic olefin of general structure (2) 

where X is a halogen, i.e., F, Cl, Br, or I and $R_f$ has the meaning defined under Formula 1. The reaction can be illustrated simply by the following equation which, however, is not to be construed as showing the mechanism of the reaction:

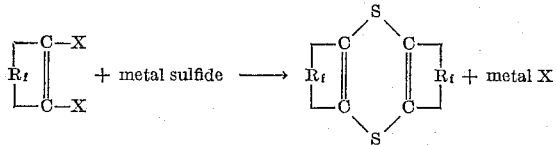

It is evident from this equation that the metal component of the sulfide does not appear in the new compounds and that it is therefore not a critical feature of the process of the invention. Commercially available metal sulfides can be employed in the process and they need not be especially purified prior to use. For example, the reaction can be conducted with a sulfide of lithium, sodium, potassium, cesium, calcium, magnesium, barium, strontium, mercury, copper, zinc, iron, cobalt, nickel, tin, manganese, chromium, lead, antimony, bismuth and the like. Polysulfides can be employed, e.g., sodium polysulfides. Sulfides of the alkali metal or alkaline earth metals are readily available and they form a preferred group of metal sulfide reactants.

Any polyhalogenated polyfluorocyclic olefin whose structure conforms to Formula 2 can be employed. The $R_f$ group does not enter into the reaction and the group appears unchanged in the final product. The definition of the $R_f$ group, therefore, in both its broad and its preferred aspects, in Formula 2 is the same as the definition of $R_f$ in the compounds of Formula 1. Compounds of Formula 2 in which X is fluorine, chlorine or bromine are preferred because of availability and smoothness of reaction. Especially preferred are compounds of Formula 2 in which X is fluorine or chlorine.

The following polyhalogenated polyfluorocyclic olefins are illustrative of this class of reactants which can be used in the process: 1-chloro-2,3,3,4,4-pentafluorocyclobutene, 1,2-dichloro-3,3,4,4-tetrafluorocyclobutene, perfluorocyclobutene, 1,2-dichloro-3,3,4,4,5,5-hexafluorocyclopentene, 1,2 - dichloro - 3,3,4,4,5,5,6,6-octafluorocyclohexene, perfluorocyclohexene, perfluoro-4-methylcyclohexene, nonafluoro-4H-cyclohexene, octafluoro-4H,5H-cyclohexene, and the like.

Polyhalogenated polyfluorocyclic olefins can be prepared by procedures disclosed in the literature [see, for example, U.S. 2,436,142, 2,932,651 and Lovelace, Rausch and Postelnek, "Aliphatic Fluorine Compounds," Chap. III, Reinhold Publishing Corp. (1958)].

The process is conducted by direct mixing of the reactants for a time sufficient to effect substantial completion of the reaction. A liquid medium, inert to the reactants, is frequently employed to facilitate contact between the components of the reaction. It is preferable to employ a liquid medium in the process although it is not essential for operability to do so. Liquid media which can be used are N,N-dialkylformamides, nitriles, dialkylsulfoxides, alcohols, dialkyl ethers, and the like. To illustrate, liquids which can be used include dimethylformamide, diethylformamide, acetonitrile, propionitrile, dimethylsulfoxide, methanol, ethanol, diethyl ether, dibutyl ether, and the like. Dialkylformamides and nitriles are especially preferred as liquid media, e.g., dimethylformamide and acetonitrile.

The ratio in which the reactants are used is not critical. The sulfur in the metal sulfide appears in the final product and it is desirable, therefore, from a point of view of economics to use an excess of the metal sulfides. The ratio, moles of metal sulfide/moles of polyhalogenated polyfluorocyclic olefin, normally will lie between about 0.2 and 10. Preferably, the mole ratio will lie between about 0.5 and 3.0. The mole ratio which is employed will generally be the ratio which provides maximum economic utilization of the polyhalogenated polyfluorocyclic olefin.

Conventional reaction vessels are employed in the process. The vessels are generally made of corrosion-resistant material to avoid formation of extraneous by-products which can reduce the yield of desired products. Vessels of glass, stainless steel, noble metals or of commercially available resins, such as poly(tetrafluoroethylene) resin, can be employed. The reaction vessel is usually equipped with means for agitating the reactants during the process, e.g., by mechanical stirring or shaking of the entire vessel.

The process is operable over a wide range of temperatures. It can be conducted at a temperature as low as 0° C. or lower, or the reactants can be heated to expedite the process, e.g., to 100° C. or higher. Excessively high temperatures are unnecessary. In fact, the reaction is most conveniently conducted at the prevailing atmospheric temperature.

Pressure is not a critical factor in the operation of the process. The reaction proceeds satisfactorily at prevailing atmospheric pressures although pressures above and below atmospheric can be used, if desired.

The reaction proceeds with reasonable speed and it can be accelerated, if desired, by warming. Time is thus not a critical variable in the process and no particular period of time is essential for operability. The time employed is determined to some extent by the type of process which is used, i.e., whether continuous or batch. In a continuous process it is customary to employ short periods of time, less than one minute, and elevated temperatures to expedite the reaction whereas in a batch process a longer time of contact is used, e.g., times up to 24 hours or higher can be used to obtain a high yield of product. Generally, a period of about 1–20 hours is sufficient.

The reaction can be conducted in the presence of air or it can be performed under an inert atmosphere such as nitrogen, helium, and the like. It is not essential that the vessel be closed to exclude oxygen or moisture although it is customary, in accordance with good chemical housekeeping practice, to exclude free water and adventitious impurities as much as possible during the operation of the process.

The desired reaction product can be separated by conventional procedures. Most conveniently, the reaction mass is poured into water and the mixture is stirred thoroughly. The organic liquid layer is separated and the water layer is extracted repeatedly with a hydrocarbon solvent, e.g., petroleum ether, benzene, toluene, and the like. The organic liquid layer and extracts are combined and dried by contacting with a dehydrating agent, e.g., anhydrous $MgSO_4$, anhydrous $CaSO_4$, anhydrous potassium carbonate, phosphorus pentoxide and the like. The liquid, freed of drying agent, is distilled or evaporated to yield the desired reaction product as a solid residue. The product can be purified by crystallization from solvents such as methanol, ethanol, methyl acetate, acetone and the like.

The following examples are given to illustrate the present invention but they are not to be construed as limiting.

*Example I*

A mixture of 48.8 g. of 1,2-dichlorotetrafluorocyclobutene, 27.5 g. of potassium sulfide and 100 ml. of dimethylformamide is stirred at 25° C. for 12 hours. The reaction mixture is then shaken with 1 liter of cold water, the organic layer is separated and the aqueous layer is extracted with three 100-ml. portions of petroleum ether. The organic layer, previously separated, and the petroleum ether extracts are combined to form a single solution which is thoroughly washed with water. The solution is dried over anhydrous magnesium sulfate and filtered. Solvent is removed by distillation from the filtrate to leave a crystalline residue. The residue is sublimed at 90° C. and 30 mm. pressure to yield 3.1 g. of octafluoro - 2,7 - dithiatricyclo[6.2.0.0$^{3,6}$]deca - 1(8),3(6)- diene, a yellow crystalline solid which melts at 129–132° C. The compound is further purified by recrystallization from methanol to yield 2.5 g. of a product melting at 132–133° C. (sublimed). The identity of the product is confirmed by elemental analysis and by its infrared absorption spectrum.

*Analysis.*—Calc'd for $C_8F_8S_2$: C, 30.78; F, 48.69; S, 20.54. Found: C, 31.15; F, 48.56; S, 19.98, 21.36.

The compound has the following structural formula:

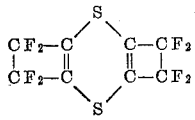

The product of Example I can be obtained by reacting, as described above, 1-chloro-2,3,3,4,4-pentafluorocyclobutene with, e.g., magnesium sulfide or lithium sulfide or by reacting perfluorocyclobutene with, e.g., cesium sulfide, ferric sulfide, tin sulfide, sodium polysulfide, calcium sulfide or barium sulfide. Other liquid media, e.g., acetonitrile or butyronitrile, can be employed in place of dimethylformamide.

*Example II*

A glass reaction vessel, fitted with a mechanical stirrer, is charged with 61.2 g. of 1,2-dichlorohexafluorocyclopentene, 27.5 g. of potassium sulfide ("sulfurated potash"), and 100 ml. of dimethylformamide. The mixture is stirred at 25° C. for 14 days. It is then poured into a separatory funnel and 1 liter of cold water is added. The mixture is shaken thoroughly and it is allowed to stand for a short time to separate into two layers. The lower organic layer is removed and the upper aqueous layer is extracted with two 50-ml. portions of petroleum ether. The petroleum ether extract and the previously separated organic layer are combined, washed with 100 ml. of 5% hydrochloric acid and with water. The organic layer is separated, dried with anhydrous calcium chloride and filtered. The filtrate is distilled to remove most of the solvents. The residue is chilled and filtered to give about 15.4 g. of crude solid product. The product is purified by recrystallization from petroleum ether at −80° C. to yield 13.6 g. of dodecafluoro-2,8-dithiatricyclo[7.3.0.0$^{3,7}$]-dodeca-1(9),3(7)-diene (also called dodecafluoro-2,3,6,7-tetrahydro-1H,5H-dicyclopenta-p-dithiin), a yellow crystalline solid which melts at 60–63° C. An additional quantity (1.2 g.) of product is obtained by working up the filtrate from the original liquor. The compound is further purified by recrystallization from methanol to yield a product melting at 63–64° C. The identity of the compound is confirmed by elemental analysis and by its infrared and nuclear magnetic resonance spectra.

*Analysis.*—Calc'd. for $C_{10}F_{12}S_2$: C, 29.13; F, 55.31; S, 15.55. Found: C, 29.39; F, 55.72; S, 15.40.

The compound has the following structural formula:

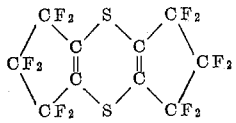

The compound shows exceptional thermal stability. When sealed in a glass tube and heated under autogenous pressure at 200° C. for 6 hours, it shows no evidence of decomposition. The compound is recovered unchanged in physical properties.

The product of Example II can be obtained by reacting 1,2-dichloro-3,3,4,4,5,5-hexafluorocyclopentene with other metal sulfides, e.g., chromium sulfide, molybdenum sulfide, bismuth sulfide, zinc sulfide, and cadmium sulfide. A solvent such as dimethylsulfoxide can be employed.

*Example III*

A mixture consisting of 22.0 g. of potassium sulfide, 38.8 g. of hexafluoro-2,5-dihydrothiophene (prepared as described in U.S. 2,932,651) and 100 ml. of dimethylformamide is stirred for 12 hours at atmospheric temperature (about 25° C.). The reaction mixture is poured into a separatory funnel and 1 liter of cold water is added. The mixture is shaken thoroughly and it is allowed to stand for a short time to separate into two layers. The organic layer is removed and the aqueous layer is extracted with three 100-ml. portions of petroleum ether. The petroleum ether extracts and the previously separated organic layer are combined, washed well with water and dried over anhydrous magnesium sulfate. The dried liquid is filtered and the filtrate is freed of solvent by evaporation. A crystalline residue is obtained which is recrystallized twice from methanol to give 7.4 g. of octafluoro-2,5,8,11-tetrathiatricyclo[7.3.0.0$^{3,7}$]-dodeca-1(9),3(7)-diene [also called octafluoro-1,3,5,7-tetrahydrodithieno (3,4-b;3',4'-e)-p-dithiin]. The compound is a pale yellow crystalline solid melting at 98–100° C., which has the following structural formula:

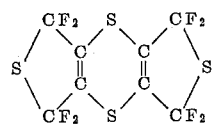

The identity of the compound is confirmed by its nuclear magnetic resonance spectrum and by elemental analysis.

*Analysis.*—Calc'd for $C_8F_8S_4$: C, 25.53; F, 40.39; S, 34.08; mol. wt., 376. Found: C, 25.84; F, 40.43; S, 34.48; mol. wt., 375, 364.

The product of Example III can be obtained by reacting hexafluoro-2,5-dihydrothiophene with other metal sulfides, e.g., calcium sulfide, molybdenum sulfide, nickel sulfide, lead sulfide, and bismuth sulfide and by employing other solvents, e.g., ethanol, propionitrile and the like.

By using the process described in the above examples, 1,2-dichloro-3,3,4,4,5,5,6,6-octafluorocyclohexene can be reacted with a metal sulfide, e.g., sodium sulfide lithium sulfide, barium sulfide, calcium sulfide, nickel sulfide and the like, to yield hexadecafluoro-2,9-dithiatricyclo-[8.4.0.0$^{3,8}$]-tetradeca-1(10),3(8)-diene. Similarly, 1,2,3,3,4,5,5,6,6-nonafluoro-4-trifluoromethylcyclohexene can be reacted with an alkali metal sulfide or alkaline earth metal sulfide to yield pentadecafluoro-6,12-trifluoromethyl-2,9-dithiatricyclo[8.4.0.0$^{3,8}$]tetradecal-1(10),3(8)-diene and its isomer, pentadecafluoro-5,12-trifluoromethyl-2,9-dithiatricyclo[8.4.0.0$^{3,8}$]tetradeca-1(10),3(8)-diene.

The compounds of the invention are generically useful as polymerization inhibitors for vinyl monomers. To illustrate, a solution of vinyl acetate is prepared which contains about 0.5% of α,α'-azobis(α,α-dimethylvaleronitrile), a known polymerization initiator. This solution is divided into four parts. To one part, about 0.5% by weight of the compound of Example I is added; to a second part, about 0.5% by weight of the compound of Example II is added; and to the third part, about 0.5% by weight of the compound of Example III is added. The fourth part is used as a control. The four samples are heated at 70° C. for 10 minutes and, at the end of this period, the viscosity of a 0.4-ml. portion of each sample is estimated by measuring the time required to drain from a 1-ml. pipette. The data are as follows:

Test solution:                                Time to drain
   (A) Monomer+initiator _____ Set to a glass.
   (B) A+compound of Ex. I _____ 72 secs.
   (C) A+compound of Ex. II _____ 29 secs.
   (D) A+compound of Ex. III _____ 3 secs.

It is evident that, even in the presence of a polymerization initiator, the compounds are excellent polymerization inhibitors.

Since obvious modifications and equivalents in the invention will be apparent to those skilled in the chemical arts, I propose to be bound solely by the appended claims.

The embodiments of the invention in which an exclusive property or privilege is claimed are defined as follows:

1. Compounds of the formula

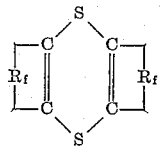

where $R_f$ is a saturated divalent radical in which the terminal members are —$CF_2$— selected from the group consisting of polyfluorohydrocarbon, oxygen-interrupted polyfluorohydrocarbon and sulfur-interrupted polyfluorohydrocarbon, said divalent radical having a continuous chain of 2–4 carbons and at most one intracatenic atom other than carbon.

2. Ocotafluoro - 2,7 - dithiatricyclo[6.2.0.0$^{3,6}$]deca-1(8),3(6)-diene.

3. Dodecafluoro - 2,8 - dithiatricyclo[7.3.0.0$^{3,7}$]dodeca-1(9),3(7)-diene.

4. Octafluoro - 2,5,8,11 - tetrathiatricyclo[7.3.0.0$^{3,7}$]-dodeca-1(9),3(7)-diene.

5. The process which comprises reacting a metal sulfide with a polyfluorinated cyclic olefin of the formula

wherein X is halogen and $R_f$ is a saturated divalent radical in which the terminal members are —$CF_2$— selected from the group consisting of polyfluorohydrocarbon, oxygen-interrupted polyfluorohydrocarbon and sulfur-interrupted polyfluorohydrocarbon, said divalent radical having a continuous chain of 2–4 carbons and at most one intracatenic atom other than carbon.

6. The process of claim 5 wherein the metal sulfide is that of an alkali metal.

7. The process of claim 5 wherein the metal sulfide is that of an alkaline earth metal.

8. The process of claim 5 accomplished in an organic liquid reaction medium selected from the group consisting of N,N-dialkylformamides, nitriles, dialkylsulfoxide, alcohols and dialkyl ethers inert to the reactants.

9. The process which comprises reacting a metal sulfide with 1,2-dichlorotetrafluorocyclobutene.

10. The process which comprises reacting a metal sulfide with 1,2-dichlorohexafluorocyclopentene.

11. The process which comprises reacting a metal sulfide with hexafluoro-2,5-dihydrothiophene.

No references cited.